(12) United States Patent
Thompson

(10) Patent No.: US 12,268,118 B2
(45) Date of Patent: Apr. 8, 2025

(54) SYSTEM AND METHOD FOR AUTOMATIC PARAMETER SELECTION USING GRANULAR PRODUCT CHARACTERISTIC SENSING

(71) Applicant: CNH Industrial Canada, Ltd., Saskatoon (CA)

(72) Inventor: Dennis George Thompson, Eagle Ridge (CA)

( * ) Notice: Subject to any disclaimer, the term of this patent is extended or adjusted under 35 U.S.C. 154(b) by 917 days.

(21) Appl. No.: 17/394,979

(22) Filed: Aug. 5, 2021

(65) Prior Publication Data

US 2023/0039311 A1  Feb. 9, 2023

(51) Int. Cl.
*A01C 7/10* (2006.01)
*A01B 79/00* (2006.01)

(52) U.S. Cl.
CPC ............ *A01C 7/105* (2013.01); *A01B 79/005* (2013.01)

(58) Field of Classification Search
CPC ....... A01C 7/105; A01C 7/081; A01C 15/006; A01B 79/005
See application file for complete search history.

(56) References Cited

U.S. PATENT DOCUMENTS

| | | | |
|---|---|---|---|
| 5,321,764 | A | 6/1994 | Cullen et al. |
| 7,938,075 | B1 | 5/2011 | Glenenning et al. |
| 9,575,210 | B2 | 2/2017 | Liebich et al. |
| 2019/0289774 | A1 | 9/2019 | Prystupa et al. |
| 2020/0245529 | A1* | 8/2020 | Thompson ............. A01C 7/102 |
| 2021/0007271 | A1* | 1/2021 | Schoeny ................. G01L 21/00 |
| 2021/0007272 | A1* | 1/2021 | Schoeny ................. A01C 7/046 |
| 2021/0243945 | A1* | 8/2021 | Schmidt ................. A01C 21/005 |
| 2021/0337719 | A1* | 11/2021 | Schmidt ................. A01C 7/081 |
| 2022/0260747 | A1* | 8/2022 | Schoon ............... G06F 3/04847 |

FOREIGN PATENT DOCUMENTS

| | | |
|---|---|---|
| CN | 210868701 U | 6/2020 |
| CN | 1121102258 A | 12/2020 |
| EP | 2949194 A1 | 12/2015 |

OTHER PUBLICATIONS

Luo, Yi-Rong; "The Automatic Classification of the Agricultural Products Based on the Wavelet Texture Analysis", International Conference on Computer Science and Network Technology, Dec. 24-25, 2011, pp. 2791-2794.

* cited by examiner

*Primary Examiner* — Richard M Camby
(74) *Attorney, Agent, or Firm* — Rebecca Henkel; Peter K. Zacharias; Rickard DeMille

(57) ABSTRACT

A granular product detection system is provided. The system includes a first sensor or first sensor array configured to couple to an air cart or a fill system that fills a tank of the air cart with a granular product, wherein the first sensor or first sensor array is configured to automatically detect at least a product type of the granular product. The system also includes a controller coupled to the first sensor or first sensor array and configured to receive feedback from the first sensor or first sensor array to automatically determine a control parameter related to a conveyance of the granular product based at least on the product type of the granular product.

13 Claims, 4 Drawing Sheets ized tank) having separate compartments for different product types (e.g., seed, fertilizer, etc.), an air source (e.g., a blower), and a metering assembly. More specifically, the granular products (seeds, fertilizer, etc.) may be gravity fed from the storage tank into the metering assembly, which distributes a desired flow rate of the granular products to each of the row units. For example, the air source may generate an air stream and the metering assembly may control flow of granular products into the air stream such that the granular products are entrained in the air stream. The air stream may then be supplied to each of the row units via primary lines fluidly coupled between the metering assembly and the row units, thereby delivering the granular products to each of the row units for deposition. These different granular products can either be distributed through the same distribution lines or separate lines (e.g., for seed and fertilizer). Conveying different products in separate lines and deposited in separate soil trenches by the openers is commonly known as a "double-shoot" seeding system. Conversely, products can also be combined in the same distribution line for deposition in the same soil trench. Seeding systems that strictly deliver products in a common distribution line (e.g., seed and fertilizer) are commonly known as "single shoot" systems. With double shoot systems, it is also common practice to combine products in the same line when blending products in the same soil trench is desired ("starter" fertilizer with seed for instance). Setting up the machine configuration (e.g., of the air cart) for distributing the product is a time consuming process. In addition, many aspects of setting up the machine configuration are done manually by the machine operator who may commit errors while configuring the machine.

SYSTEM AND METHOD FOR AUTOMATIC PARAMETER SELECTION USING GRANULAR PRODUCT CHARACTERISTIC SENSING

BACKGROUND

The disclosure relates generally to an agricultural product distribution system and, more specifically, a granular product sensing system of the agricultural product distribution system.

Generally, a seeding implement (e.g., a seeder) may be towed behind an off-road vehicle, such as a tractor, via a mounting bracket secured to a rigid frame of the seeding implement. The seeding implement may include multiple row units distributed across a width of the implement. More specifically, each row unit may deposit seeds at a desired depth beneath the soil surface of a field as the seeding implement is towed. For example, each row unit may include a ground engaging tool or opener that forms a seeding path (e.g., trench) into the soil. A seed tube may then deposit a granular product, such as seeds and/or fertilizer, into the trench. As the row unit travels through the field, closing discs may move excavated soil back into the trench covering the granular product. In this manner, rows of seeds may be planted.

In certain configurations, the granular product may be delivered to the row units of the seeding implement from a centralized location, such as an air cart. In certain embodiments, the air cart may be connected in series with the seeding implement (e.g., in front of or behind the seeding tool to form a multi-implement train). The air cart may generally include a storage tank (e.g., a pressur-

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a granular product detection system is provided. The system includes a first sensor or first sensor array configured to couple to an air cart or a fill system that fills a tank of the air cart with a granular product, wherein the first sensor or first sensor array is configured to automatically detect at least a product type of the granular product. The system also includes a controller coupled to the first sensor or first sensor array and configured to receive feedback from the first sensor or first sensor array to automatically determine a control parameter related to a conveyance of the granular product based at least on the product type of the granular product.

In another embodiment, a method for granular product detection for an air cart is provided. The method includes receiving, at a controller, feedback from one or more sensors or sensor arrays, wherein the one or more sensors or sensor arrays are configured to automatically detect at least a respective product type of a respective granular product within a respective tank of an air cart. The method also includes automatically determining, at the controller, a control parameter related to a conveyance of one or more granular products based at least on the respective product types of the one or more granular product based on feedback from the one or more sensors or sensor arrays.

In a further embodiment, a non-transitory computer-readable medium is provided. The computer-readable medium includes processor-executable code that when executed by a processor, causes the processor to receive feedback from one or more sensors or sensor arrays, wherein the one or more sensors or sensor arrays are configured to automatically detect at least a respective product type of a respective granular product within a respective tank of an air cart. The computer-readable medium also includes processor-executable code that when executed by the processor, causes the processor to automatically determine a control parameter related to a conveyance of one or more granular products based at least on the respective product types of the one or more granular product based on feedback from the one or more sensors or sensor arrays.

DRAWINGS

These and other features, aspects, and advantages of the present disclosure will become better understood when the following detailed description is read with reference to the accompanying drawings in which like characters represent like parts throughout the drawings, wherein.

Figure 4:
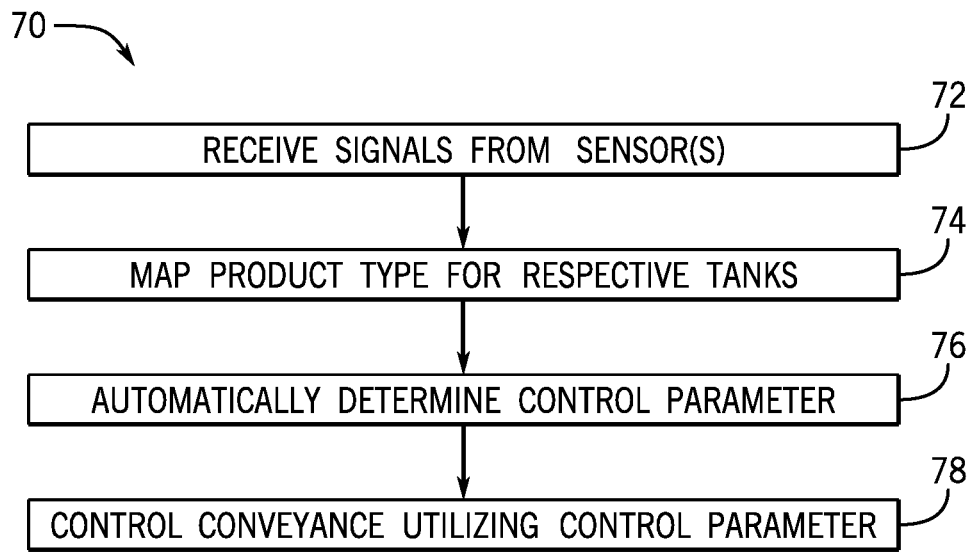
Figure 5:
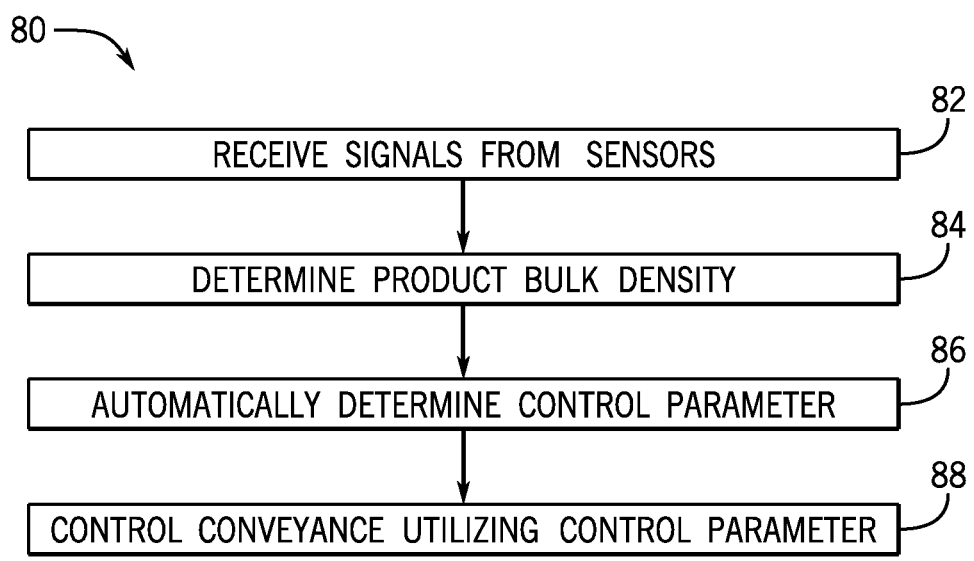

FIG. 4 is a flowchart of an embodiment of a method for determining a control parameter related to a conveyance of one or more granular products, in accordance with an aspect of the present disclosure; and FIG. 5 is a flowchart of another embodiment of a method for determining a control parameter related to a conveyance of one or more granular products, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Generally, an agricultural product distribution system may include a towable agricultural implement to deposit a granular product into the soil. As used herein, the granular product may be any suitable particulate material that is desired to be deposited into the ground, such as various types of seeds and fertilizers. Nevertheless, one or ordinary skill in the art would recognize that the techniques described herein may be easily adapted for use with other products.

More specifically, the agricultural implement may include row units that open the soil, dispense the granular product into the soil opening, and re-close the soil as the agricultural implement is towed across a field, for example, by an off-road work vehicle, such as a tractor. Additionally, the agricultural product distribution system may include an air cart that distributes the granular product to the row units on the agricultural implement. More specifically, in some embodiments, a product distribution system on the air cart may pneumatically convey the granular product to the row units. For example, the metering assembly may control output of the granular product from a storage tank into an air stream, which is then delivered to the row units by a blower via pneumatic lines (e.g., including a primary line coupled to the air cart) that fluidly connects the metering assembly to the row units.

With the increasing need for automated control systems on agricultural seeders and planters, some systems may require product-specific parameter input for optimum performance. Typically, the product type being loaded into each tank of the air cart or conveyed into specific seeder distribution lines (e.g., attached to specific delivery fans) may need to be manually entered by the operator so that particular products can be mapped to particular tanks or for variable rate prescription product application. This takes time and may lead to errors or poor performance if not entered correctly.

In addition, currently, product tank fill level detection utilizes ultrasonic sensors, capacitance sensors, or video cameras that communicate with the machine operator. However, these techniques are not very accurate in determining the actual tank fill volume and do not provide any feedback on the actual product type loaded in a particular tank. Recently, individual tank weigh scales have been utilized to more accurately detect product volume remaining in tanks but do not convey product type detection.

Accordingly, as will be described in more detail below, embodiments described herein provide a granular product detection or sensing system configured to detect a product type and/or product characteristics of granular products within respective tanks of an air cart as the tanks are being filled, after the tanks are filled, or during initial metering of the respective granular products from the tanks. In certain embodiments, the granular product detection system includes a sensor or sensor array (e.g., multiple sensors in a single sensor housing) disposed within each tank of the air cart. In certain embodiments, the granular product detection system includes a sensor or sensor array disposed within a fill system (e.g., auger, conveyor, etc.). In certain embodiments, the granular product detection system includes a sensor or sensor array coupled to each respective metering system associated with a respective tank of the air cart. Besides detecting the product type of the granular product, the granular product detection system may determine attributes of the granular product such as particle shape, particle size, color, and/or other attributes. The granular product detection system may also be able to determine a fill volume or fill level within of the granular product within a respective tank. This fill volume may be utilized in conjunction with a weight of the granular product within a respective tank to determine a bulk density. The one or more sensor or sensor arrays provide feedback to a controller that automatically determines (and implements) one or more control parameters (e.g., machine control algorithm parameters) related to a conveyance of the granular product. For example, a parameter (e.g., fan speed, air velocity, mass air flow rate, etc.) for an automatic fan control system of the air cart or a meter calibration parameter (e.g., a product application rate or an amount of product dispersed) may be automatically determined. In certain embodiments, the control parameter may be determined by the granular product type. In other embodiments, the control parameter may be determined by both granular product type and other product characteristics (e.g., bulk density, particle shape/size, etc.). In some embodiments, the control parameter may be determined by one of the product characteristics (e.g., bulk density).

Utilization of the granular product detection system eliminates the need for manual operator entry. It also eliminates the need for manual calibration of the air system to set initial target air velocity, mass air flow rate, and/or fan speed. In addition, it enables faster machine configuration and/or product change-over. Further, it provides error-proofing of the machine configuration process (e.g., by suggesting a specific configuration or detecting incorrect machine setups or meter roller type). Even further, it optimizes machine performance with product specific control parameters.

Figure 1:
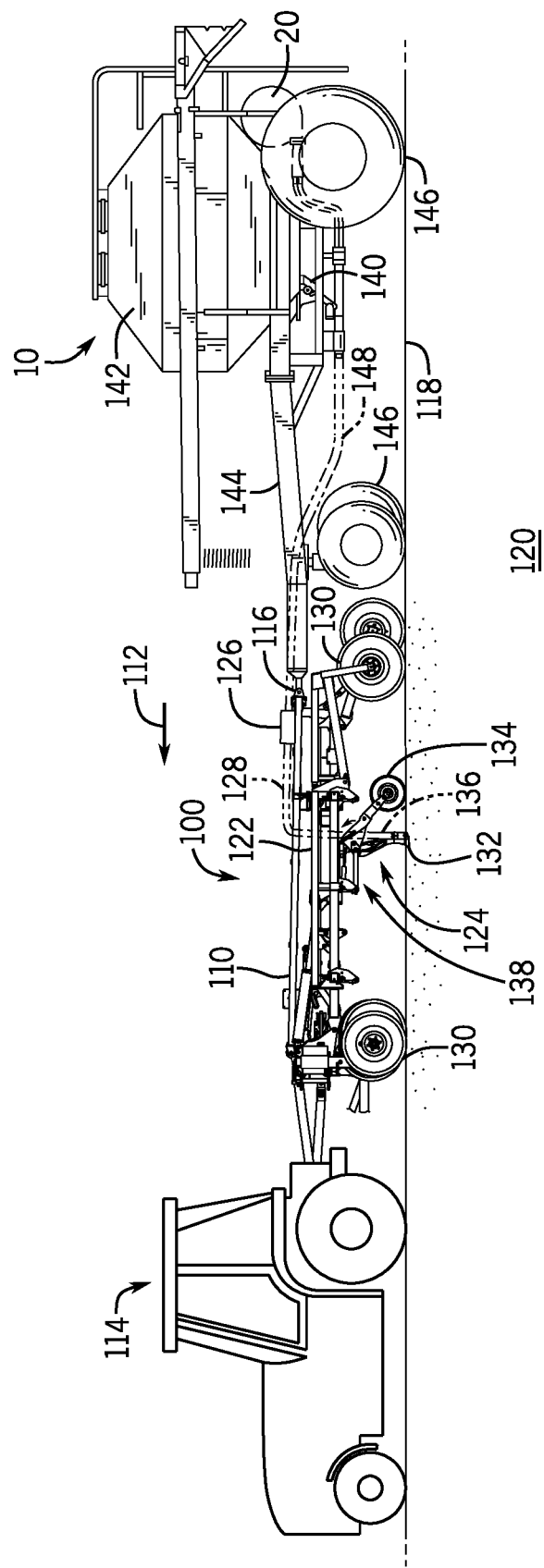
FIG. 1 is a side view of an embodiment of an air cart including a granular product detection system, in accordance with an aspect of the present disclosure.

Turning now to the drawings, FIG. 1 is a side view of an embodiment of an agricultural material application system 100. As depicted, the agricultural material application system 100 (e.g., a seeding system or a planter system) includes an agricultural implement 110 (e.g., seeding implement or seeding toolbar) coupled to an air cart 10. In the depicted embodiment, the air cart 10 is towed behind the agricultural implement 110, relative to a direction of travel 112. In addition, the agricultural implement 110 is coupled to a work vehicle 114 by a first hitch system, and the air cart 10 is coupled to the agricultural implement 110 by a second hitch system 116. While the agricultural implement 110 is towed between the work vehicle 114 and the air cart 10 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled vehicle.

The agricultural implement 110 may deposit rows of seeds into the soil as the agricultural implement 110 is towed across a surface 118 of an agricultural field 120 by the work vehicle 114. The agricultural implement 110 includes a tool frame 122 coupled to a row unit 124 (e.g., a ground engaging opener system), a distribution header 126, a hose 128, and wheel assemblies 130. The wheel assemblies 130 may contact the surface 118 to enable the agricultural implement 110 to be towed by the work vehicle 114. As the agricultural implement 110 moves in the direction of travel 112, a row of seeds may be deposited into the soil by the row unit 124. Although only one row unit 124 is shown, the agricultural implement 110 may include multiple row units 124 organized in a single row or multiple rows across the width of the agricultural implement 110. In some embodiments, the agricultural implement 110 may include a row of 12, 14, 16, 18, 20, or more row units 124, which may each deposit a respective row of seeds.

To facilitate depositing seeds, each row unit 124 includes an opener 132, a press wheel 134, a seed tube 136, and a hydraulic cylinder 138. In certain embodiments, a cutting disc may be utilized in place of the opener 132. In certain embodiments, a press wheel 134 may not be utilized. In certain embodiments, mechanical springs may be utilized for downforce instead of the hydraulic cylinder 138. When the opener 132 engages the soil, the opener 132 may exert a force that excavates a trench into the soil as the row unit 124 travels through the field. In the present embodiment, a position of the press wheel 134 controls the depth of the opener 132 and the hydraulic cylinder 138 controls the downward force (e.g., a down pressure). For example, the opener 132 may be controlled to establish a target the depth of the trench. In certain embodiments, disc coulter openers may utilize a gauge wheel situated adjacent to a cutting disc to control the working depth of the opener 132. Seeds may then be deposited into the excavated trench via the seed tube 136. Then, the press wheel 134 may facilitate movement of the excavated soil into the trench to cover the seeds and compress the soil covering the seeds.

The air cart 10 may centrally store seeds and distribute the seeds to the row unit 124. Accordingly, the air cart 10 includes a metering assembly 140 (e.g., agricultural material meter), a storage tank 142, a frame 144, wheels 146, and an air source 20. In the depicted embodiment, the air cart frame 10 is coupled to the tool frame 122 via the hitch 116. The wheels 146 may contact the surface 118 to enable the air cart 10 to be towed along with the agricultural implement 110. Additionally, the storage tank 142 may centrally store the seeds for distribution. In some embodiments, the storage tank 142 may include multiple compartments or multiple tanks on a common frame for storing different types of granular materials. For example, a first compartment may store seeds while a second compartment may store a dry fertilizer. In such configurations, the air cart 10 may deliver both seed and fertilizer to the agricultural implement 110 via separate distribution systems, or as a mixture through a single distribution system.

Generally, the distribution system may control the amount of seeds distributed to the agricultural field 120, for example, using the metering assembly 140. For example, the metering assembly 140 may be controlled to increase or decrease the amount of seeds distributed to the agricultural field 120. As depicted, the metering assembly 140 is mounted to the bottom of the storage tank 142, which may enable the storage tank 140 to supply seeds to the metering assembly 140. The metering assembly 140 may then distribute the seeds to the distribution header 126 via a respective hose 148. The distribution headers 126 may then distribute the seeds to one or more row units 124 via the hose 128. In this manner, the metering assembly 134 may control distribution of seeds from the storage tank 142 to the row units 124 and into the trenches.

Figure 2:
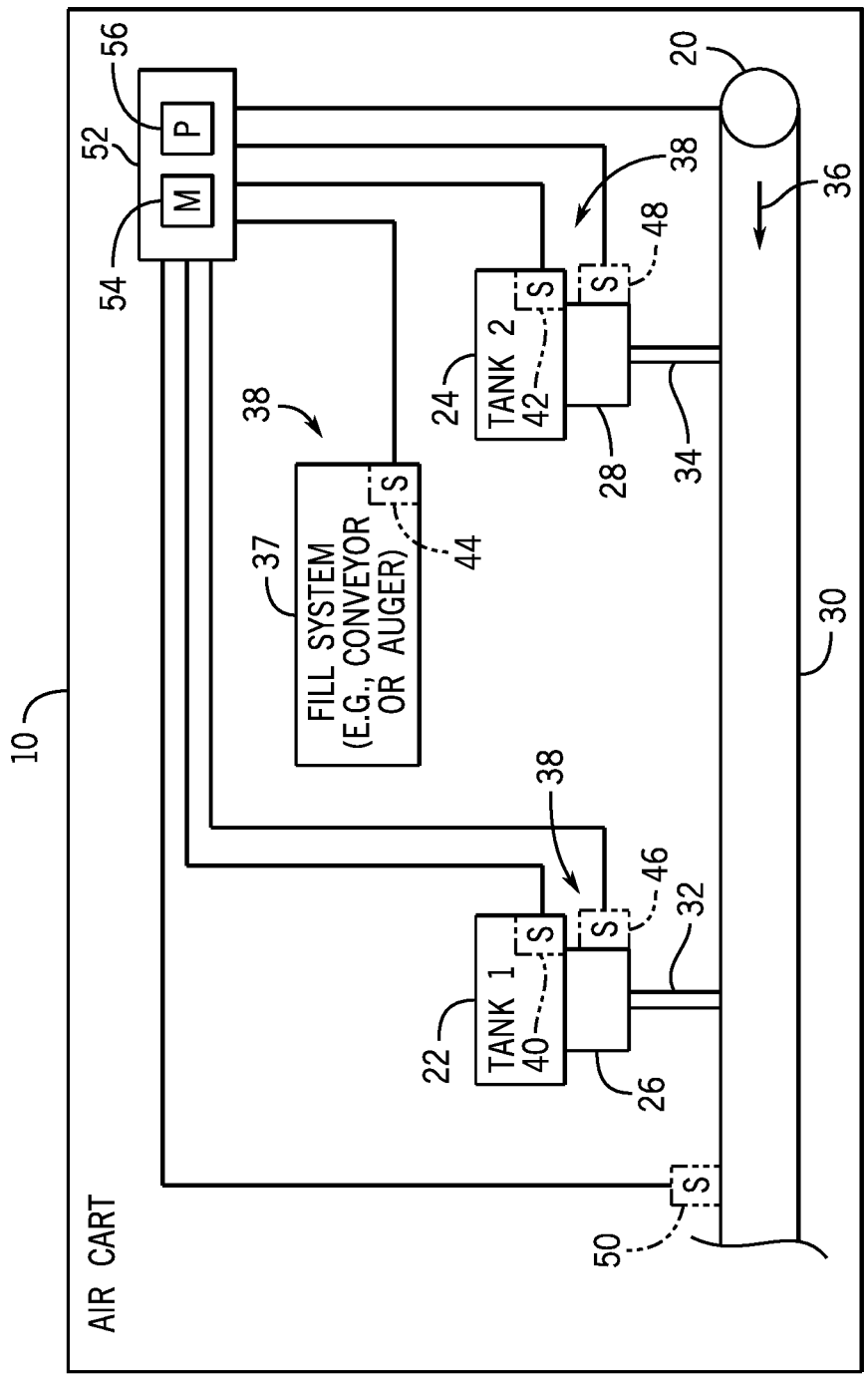
FIG. 2 is a schematic view of an embodiment of a granular product detection system that may be employed within the air cart of FIG. 1 (e.g., having a single shoot system), in accordance with an aspect of the present disclosure.

The metering assembly 140 may control the flow of seeds into an air stream generated by the air source 20, thereby controlling seed distribution to the row units for deposition into the soil. In some embodiments, the air source 20 may be fan, a pump, or a blower powered by an electric or hydraulic motor, for example. As described in greater detail below, each storage compartment may include a respective metering device (e.g., meter roller) or multiple metering devices for metering the product stored within. To more clearly illustrate in FIG. 2, a schematic view of the air cart 10 having a single shoot system is provided. As illustrated, the air cart 10 includes multiple storage tanks or compartments. In particular, the air cart 10 includes a first storage tank 22 and a second storage tank 24. The number of storage tanks or compartments may vary (e.g., 2, 3, 4, 5, etc.). The first storage tank 22 stores a first granular product type (e.g., seed) and the second storage tank 24 stores a second different granular product type (e.g., fertilizer). In certain embodiments, the air cart 10 may include more storage tanks that store different components of a fertilizer (e.g., phosphate, nitrogen, etc.). The first storage tank 22 and the second storage tank 24 are associated with respective metering devices 26, 28 that meter the respective product types from the tanks 22, 24.

The storage tanks 22, 24 are coupled to a common conduit 30 (e.g., primary line or conveyance line) via respective conduits 32, 34 (e.g., secondary conduits). In certain embodiments, the secondary conduits 32, 34 may be integral parts of the metering devices. In certain embodiments, more than two storage tanks may be coupled to a primary line via respective conduits. In certain embodiments, the air tank 10 may include multiple common conduits or primary lines coupled to multiple storage tanks. The different product types may be entrained in the air flow 36 from the air source 20 within the common conduit 30.

In certain embodiments, the air cart 10 includes a fill system 37 (e.g., on-board fill system) for filling the respective storage tanks 22, 24 with different granular products. In certain embodiments, a fill system 37 separate from the air tank 10 may be utilized for filling the respective storage tanks 22, 24. The fill system 37 may be an auger, a conveyor, or another mechanism for conveying the product.

The air cart 10 includes a granular product detection system 38. The granular product detection system 38 includes one or more sensor or sensor arrays disposed in a respective sensor housing. The one or more sensors or sensor arrays are configured to detect or determine granular product types as a granular product is being filled within a tank, after the tank is filled with the granular product, or as the granular product is initially being metered from the tank depending on the locations of the sensors of the granular product detection system 38. The sensors or sensor arrays may utilize one or more of photoelectric sensing, machine vision sensing, piezoelectric sensing, acoustic sensing, and/or another sensing technology. Different characteristics that may be sensed and utilized by the sensors or sensors arrays to detect or determine product types include shape, size, color, and/or other characteristics. In certain embodiments, a single sensor within a sensor housing may determine or detect the granular product type of the product within a sensing area. In certain embodiments, a sensor array having multiple sensors within a single sensor housing may determine or detect the granular product type of the product within a sensing area. In certain embodiments, multiple sensors or sensor arrays (e.g., in respective sensor housings) may be disposed at different locations to enable detecting or determining a product type of a product in the sensing area. In certain embodiments, a sensor or sensor array may be coupled to a tank to determine a weight of the product within the tank.

In certain embodiments, one or more sensors or sensor arrays 40, 42 may be disposed within each storage tank 22, 24, respectively, to detect the product type and/or attributes of the product within the respective storage tank 22, 24. In certain embodiments, one or more sensors or sensor arrays 40, 42 disposed within the storage tanks 22, 24 may detect an actual fill volume or fill level of the respective product within the storage tanks 22, 24. In certain embodiments, one or more sensors or sensor arrays 40, 42 disposed within the storage tanks 22, 24 may determine a weight of the respective product within the storage tanks 22, 24.

Alternatively, one or more sensors or sensor arrays 44 may be coupled to the fill system 37 to detect the product type and/or attributes of a respective product as it is being filled within a respective storage tank 22, 24. In certain embodiments, which storage tank 22, 24 is being filled may be communicated so that the sensor signals are associated with the correct storage tank 22, 24 being filled. In certain embodiments, one or more sensors or sensor arrays 44 coupled to the fill system 37 may detect an actual fill volume or fill level of the respective product within the storage tanks 22, 24.

In certain embodiments, one or more sensors or sensor arrays 46, 48 may be coupled to the respective metering devices associated with the storage tanks 22, 24 to detect the product type and/or attributes of the product within the respective storage tank 22, 24 as they are initially metered form the tanks 22, 24. In certain embodiments, one or more sensors or sensor arrays 50 may be disposed along the common conduit 30. For example, the one or more sensors or sensor arrays 50 may be disposed at a location along common conduit 30 where the products from both storage tanks 22, 24 has been blended. The one or more sensors or sensor arrays 46, 48 may detect the product type and/or attributes of the product within the common conduit 30.

The granular product detection system 38 includes a controller 52 coupled to the sensors or sensor arrays 40, 42, 44, 46, 48, 50. As depicted, the controller 52 is also coupled to the metering devices 26, 28 and the air source 20. The controller 52 is configured to receive feedback or signals from the sensor or sensor arrays 40, 42, 44, 46, 48 to map (e.g., via a high definition map) the different product types to the respective storage tanks 22, 24. The controller 52 is also configured to receive feedback or signals from the sensor or sensor arrays 40, 42, 44 to determine a product bulk density of a respective product within a respective storage tank 22, 24. For example, the controller 52 may take signals representative of the actual fill volume or fill level within a respective storage tank 22, 24 and the weight of the product within the same respective storage tank 22, 24 to determine the product bulk density (e.g., tank weight/actual fill volume product=bulk density).

In certain embodiments, the controller 52 is configured to automatically determine a control parameter related to a conveyance of one or more granular products based on the feedback from the sensors or sensor arrays 40, 42, 44, 46, 48. For example, a parameter (e.g., fan speed, air velocity, mass air flow rate, etc.) for an automatic fan control system of the air cart or a meter calibration parameter (e.g., a product application rate or an amount of product dispersed) may be automatically determined. In certain embodiments, the control parameter may be determined by the granular product type. In other embodiments, the control parameter may be determined by both granular product type and other product characteristics (e.g., bulk density, particle shape/size, etc.). In some embodiments, the control parameter may be determined by one of the product characteristics (e.g., bulk density).

The controller 52 may include a memory 54 and a processor 56. In some embodiments, the processor 56 may include one or more general purpose processors, one or more application specific integrated circuits, one or more field programmable gate arrays, or the like. Additionally, the memory 54 may be any tangible, non-transitory, computer readable medium that is capable of storing instructions executable by the processor 56 and/or data that may be processed by the processor 56. In other words, the memory 54 may include volatile memory, such as random access memory, or non-volatile memory, such as hard disk drives, read only memory, optical disks, flash memory, and the like.

Figure 3:
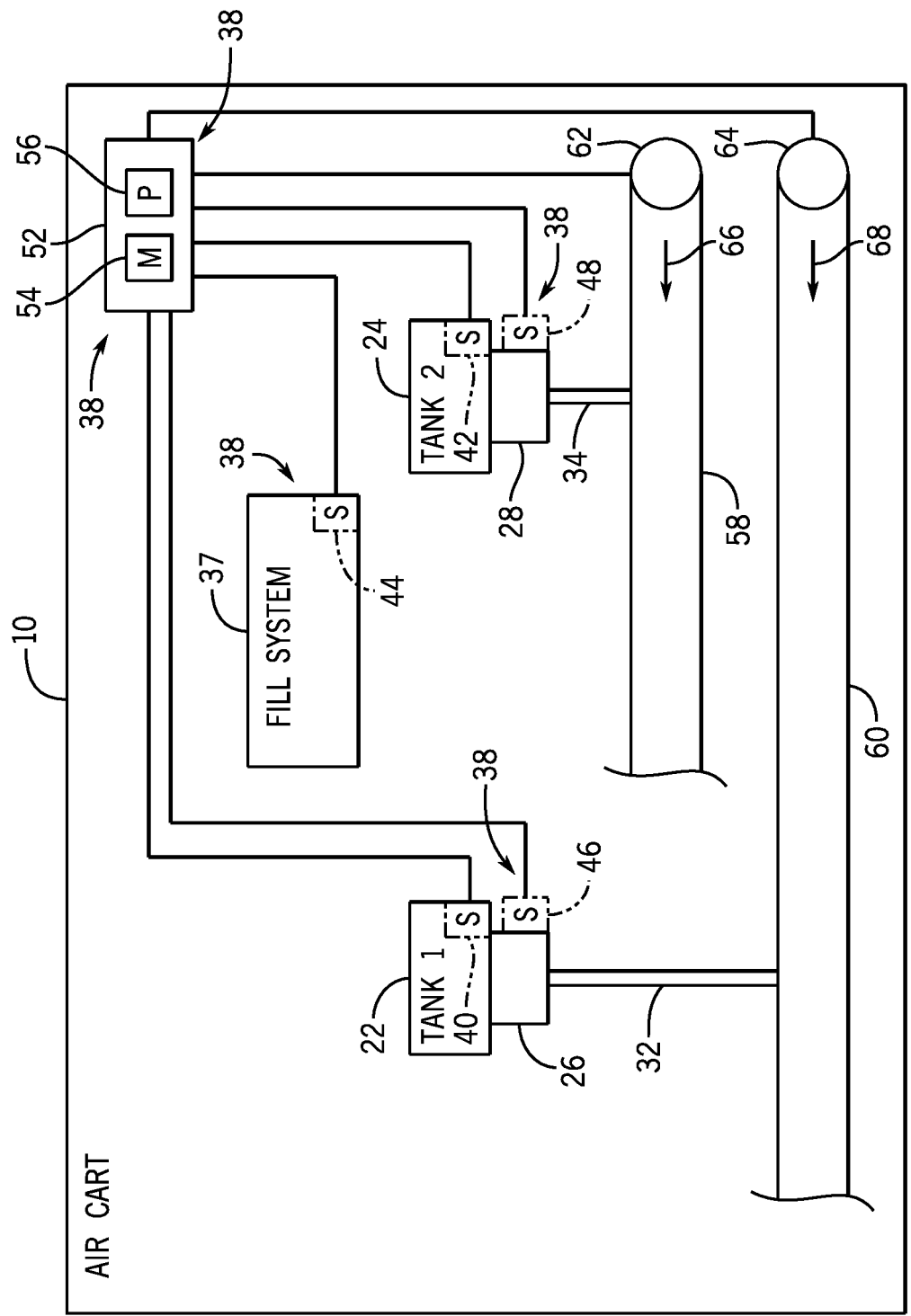
FIG. 3 is a schematic view of an embodiment of a granular product detection system that may be employed within the air cart of FIG. 1 (e.g., having a double shoot system), in accordance with an aspect of the present disclosure.

In certain embodiments, the air cart 10 may include a double shoot system as depicted in FIG. 3. In FIG. 3, a separate conduit 58 is coupled to the secondary conduit 34 coupled to the storage tank 24. Also, a separate conduit 60 is coupled to the secondary conduit 32 coupled to the storage tank 22. Each conduit 58, 60 is coupled to a respective air source 62, 64. The air sources 62, 64 may be fans, pumps, or blowers powered by an electric or hydraulic motors, for example. The different product types may be entrained in the air flow 66, 68 from the respective air sources 62, 64 in the respective conduits 58, 60. In certain embodiments, the different product types may be kept separate during distribution. In other embodiments, the different product types may be blended at some point downstream of the storage tanks 22, 24. The granular product detection system 38 is as described in FIG. 2.

FIG. 4 is a flowchart of an embodiment of a method 70 for determining a control parameter related to a conveyance of one or more granular products. The steps of the method 70 may be performed by the controller 52 of the air cart 10 described above. The method 70 includes obtaining or receiving one or more signals (e.g., feedback) from one or more sensors or sensor arrays of a granular product detection system 38 (block 72). As described above, in certain embodiments, the sensors or sensors arrays may be disposed within each respective storage tank to detect the product type and/or attributes of the product within the respective storage tanks. In certain embodiments, the sensors or sensor arrays disposed within the storage tanks may detect an actual fill volume or fill level of the respective product within the storage tanks. In certain embodiments, the sensors or sensor arrays disposed within the storage tanks may determine a weight of the respective product within the storage tanks. Alternatively, the sensors or sensor arrays may be coupled to the fill system to detect the product type and/or attributes of a respective product as it is being filled within a respective storage tank. In certain embodiments, which storage tank is being filled may be communicated so that the sensor signals are associated with the correct storage tank being filled. In certain embodiments, one or more sensors or sensor arrays coupled to the fill system may detect an actual fill volume or fill level of the respective product within the storage tanks. In certain embodiments, one or more sensors or sensor arrays may be coupled to the respective metering devices associated with the storage tanks to detect the product type and/or attributes of the product within the respective storage tank as they are initially metered form the tanks.

The method 70 also includes mapping (i.e., assigning a specific product type to corresponding tank in the software) the different product types to the respective storage tanks based on the detected product type and/or attributes of the product received from the sensor feedback (block 74). The method 70 further includes automatically determining (and implementing) one or more control parameters (e.g., machine control algorithm parameters) related to a conveyance of one or more granular products based at least on the product types of the granular products (block 76). In certain embodiments, determining the one or more control parameters may be based on the respective product types of the granular products. In other embodiments, determining the one or more control parameters may be based on respective product types and product attributes (e.g., bulk density, particle shape/size, etc.). In certain embodiments, assigned control parameters may be selected by a combination of parameters such as product type and target application rate (e.g., fan speed may need to increase as application rate increases for a particular product type. In some embodiments, the control parameter may be determined by one of the product characteristics (e.g., bulk density). An example for a control parameter includes a parameter (e.g., fan speed, air velocity, mass air flow rate, etc.) for an automatic fan control system of the air cart. Another example of a control parameter, includes a meter calibration parameter (e.g., a product application rate or an amount of product dispensed per revolution of meter roller).

The method 70 even further includes controlling the conveyance of the one or more granular products from the air cart utilizing the one or more automatically determined control parameters (block 78). In certain embodiments, the controller may attempt to verify the determined control parameters. For example, meter torque or current sensing of meter motors may be utilized to auto-detect or confirm product type sensing based on the meter response during the initial calibration procedure. This information could be used to alter metering performance parameters or suggest a more optimum meter roller based the product detected, calibration results, and desired application rate range.

FIG. 5 is a flowchart of an embodiment of a method 80 for determining a control parameter related to a conveyance of one or more granular products. The steps of the method 80 may be performed by the controller 52 of the air cart 10 described above. The method 80 includes obtaining or receiving one or more signals (e.g., feedback) from one or more sensors or sensor arrays of a granular product detection system 38 (block 82). As described above, in certain embodiments, the sensors or sensors arrays may be disposed within each respective storage tank to detect the product type and/or attributes of the product within the respective storage tanks. In certain embodiments, the sensors or sensor arrays disposed within the storage tanks may detect an actual fill volume or fill level of the respective product within the storage tanks. In certain embodiments, the sensors or sensor arrays disposed within the storage tanks may determine a weight of the respective product within the storage tanks. Alternatively, the sensors or sensor arrays may be coupled to the fill system to detect the product type and/or attributes of a respective product as it is being filled within a respective storage tank. In certain embodiments, which storage tank is being filled may be communicated so that the sensor signals are associated with the correct storage tank being filled. In certain embodiments, one or more sensors or sensor arrays coupled to the fill system may detect an actual fill volume or fill level of the respective product within the storage tanks. In certain embodiments, one or more sensors or sensor arrays may be coupled to the respective metering devices associated with the storage tanks to detect the product type and/or attributes of the product within the respective storage tank as they are initially metered form the tanks.

The method 80 also includes determining a product bulk density of a respective product within a respective storage tank (block 84). For example, signals or feedback representative of the actual fill volume or fill level within a respective storage tank and the weight of the product within the same respective storage tank may be utilized to determine the product bulk density (e.g., tank weight/actual fill volume product=bulk density).

The method 80 further includes automatically determining (and implementing) one or more control parameters (e.g., machine control algorithm parameters) related to a conveyance of one or more granular products based at least on the product bulk density (block 86). In certain embodiments, determining control parameters may be based on the product bulk density as well as respective product types and product attributes (e.g., bulk density, particle shape/size, application rate, etc.). An example for a control parameter includes a parameter (e.g., fan speed, air velocity, mass air flow rate, etc.) for an automatic fan control system of the air cart. Another example of a control parameter, includes a meter calibration parameter (e.g., a product application rate or an amount of product dispersed). The method 80 even further includes controlling the conveyance of the one or more granular products from the air cart utilizing the one or more automatically determined control parameters (block 88).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]" or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A granular product detection system, comprising:
 a plurality of sensors or sensor arrays, wherein each sensor or sensor array of the plurality of sensors or sensor arrays is configured to couple to a respective tank of an air cart or a respective metering system associated with each respective tank, wherein each sensor or sensor array is configured to automatically detect at least a respective product type of a granular product within the respective tank; and a controller coupled to the plurality of sensors or sensor arrays and configured to receive feedback from the the plurality of sensors or sensor arrays to automatically determine a control parameter related to a conveyance of one or more granular products based at least on the respective product types of the one or more granular products.

2. The system of claim 1, wherein the control parameter comprises a parameter for an automatic fan control system of the air cart.

3. The system of claim 2, wherein the parameter comprises rotational speed of a fan, air velocity, or mass air flow rate in a conveyance line for the granular product.

4. The system of claim 1, wherein the control parameter comprises a meter calibration parameter.

5. The system of claim 4, wherein the meter calibration parameter comprises a product application rate or an amount of product dispersed.

6. The system of claim 1, wherein the controller is coupled to each sensor or sensor array and is configured to map each respective product type to each respective tank.

7. The system of claim 1, wherein the plurality of sensors or sensor arrays is configured to automatically detect one or more attributes of the granular product, and wherein the attributes comprise particle shape, particle size, color, or a combination thereof.

8. The system of claim 1, wherein the plurality of sensors or sensor arrays is configured to automatically detect a fill volume of the granular product within the respective tank of the air cart.

9. The system of claim 1, wherein the controller is coupled to the plurality of sensors or sensor arrays, the controller is configured to determine a bulk density of the granular product within the respective tank, and the controller is configured to automatically determine the control parameter related to a conveyance of the granular product based on the bulk density of the granular product.

10. A method for granular product detection for an air cart, comprising:

receiving, at a controller, feedback from one or more sensors or sensor arrays, wherein the one or more sensors or sensor arrays are configured to automatically detect at least a respective product type of a respective granular product within each respective tank of an air cart, wherein the one or more sensors or sensor arrays are coupled to a fill system for the respective tanks of the air cart, coupled to the respective tanks of the air cart, or coupled to respective metering systems coupled to the respective tanks of the air cart; and automatically determining, at the controller, a control parameter related to a conveyance of one or more granular products based at least on the respective product types of the one or more granular products based on the feedback from the one or more sensors or sensor arrays.

11. The method of claim 10, wherein automatically determining the control parameter related to the conveyance of the one or more granular products is based on both the respective product types and respective application rates for the respective product types.

12. A non-transitory computer-readable medium, the computer-readable medium comprising processor-executable code that when executed by a processor, causes the processor to:

receive feedback from one or more sensors or sensor arrays, wherein the one or more sensors or sensor arrays are configured to automatically detect at least a respective product type of a respective granular product within each respective tank of an air cart, wherein the one or more sensors or sensor arrays are coupled to a fill system for the respective tanks of the air cart, coupled to the respective tanks of the air cart, or coupled to respective metering systems coupled to the respective tanks of the air cart; and automatically determine a control parameter related to a conveyance of one or more granular products based at least on the respective product types of the one or more granular products based on the feedback from the one or more sensors or sensor arrays.

13. The non-transitory computer-readable medium of claim 12, wherein automatically determining the control parameter related to the conveyance of the one or more granular products is based on both the respective product types and respective application rates for the respective product types.

* * * * *